US011394541B2

(12) United States Patent
Alfarano et al.

(10) Patent No.: US 11,394,541 B2
(45) Date of Patent: Jul. 19, 2022

(54) METHOD FOR THE GENERATION OF PERSONALIZED PROFILE PACKAGES IN INTEGRATED CIRCUIT CARDS, CORRESPONDING SYSTEM AND COMPUTER PROGRAM PRODUCT

(71) Applicant: STMicroelectronics S.r.l., Agrate Brianza (IT)

(72) Inventors: Marco Alfarano, Pozzuoli (IT); Sofia Massascusa, Caserta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 18 days.

(21) Appl. No.: 16/904,846

(22) Filed: Jun. 18, 2020

(65) Prior Publication Data

US 2020/0403783 A1     Dec. 24, 2020

(30) Foreign Application Priority Data

Jun. 19, 2019   (IT) .......................... 102019000009543

(51) Int. Cl.
*H04L 9/08* (2006.01)
*G06K 19/07* (2006.01)

(52) U.S. Cl.
CPC .......... *H04L 9/088* (2013.01); *G06K 19/0723* (2013.01)

(58) Field of Classification Search
CPC ....... H04L 9/088; H04L 67/34; H04L 67/306; G06K 19/0723; H04W 4/60; H04W 12/03;

(Continued)

(56) References Cited

U.S. PATENT DOCUMENTS 7,263,579 B2 * 8/2007 Rothman ............ G06F 12/0862
                                                          711/100
10,339,299 B1 * 7/2019 Magnuson ............ G06F 21/629
(Continued)

FOREIGN PATENT DOCUMENTS

EP       1848144 A2    10/2007
WO       03065319 A1    8/2003

OTHER PUBLICATIONS

Simalliance Ltd., "eUICC Profile Package: Interoperable Format Technical Specification", Version 1.0, Jun. 25, 015, 65 pages. (Year: 2015).*

(Continued)

*Primary Examiner* — Sanchit K Sarker
(74) *Attorney, Agent, or Firm* — Slater Matsil, LLP

(57) ABSTRACT

In an embodiment a method includes providing a table including a plurality of data records (R1 ... Rn) corresponding to a plurality of profile data, providing a master profile including fields to be personalized (F1 ... Fk ... Fp) corresponding to one or more of the data records (R1 ... Rn) to store the different types of personalization values (V1 ... Vm), combining the one or more of the data records (R1 ... Rn) in the table with the master profile by inserting the personalization values (V1 ... Vm) in the fields to be personalized (F1 ... Fk ... Fp) to obtain respective personalized profile packages, coding the one or more of the data records (R1 ... Rn) to obtain encoded data records (CRi), applying the coding to the offset table to obtain encoded data offset (COi) and combining for each record (Ri) the encoded data record (CRi) and the data offset (OCi) in an encoded personalization record (URi).

17 Claims, 10 Drawing Sheets

(58) Field of Classification Search
CPC ....... H04W 8/20; H04W 12/35; H04W 8/183; G06F 40/126; G06F 16/901
USPC ........................................................ 713/171
See application file for complete search history.

(56) References Cited

U.S. PATENT DOCUMENTS

| | | | |
|---|---|---|---|
| 11,005,754 B1* | 5/2021 | Baldi | H04L 45/56 |
| 2006/0036748 A1* | 2/2006 | Nusbaum | G06F 16/9535 |
| | | | 709/228 |
| 2014/0337466 A1* | 11/2014 | Li | H04L 67/10 |
| | | | 709/217 |
| 2016/0142906 A1* | 5/2016 | Park | H04W 12/04 |
| | | | 455/419 |
| 2018/0221749 A1* | 8/2018 | Le | G06Q 10/06 |
| 2019/0354667 A1 | 11/2019 | Alfarano et al. | |
| 2020/0137030 A1* | 4/2020 | Alfarano | H04W 4/50 |
| 2020/0403783 A1 | 12/2020 | Alfarano et al. | |

OTHER PUBLICATIONS

Simalliance Ltd., "eUICC Profile Package: Interoperable Format Technical Specification", Version 1.0, Jun. 25, 2015, 65 pages.

* cited by examiner

METHOD FOR THE GENERATION OF PERSONALIZED PROFILE PACKAGES IN INTEGRATED CIRCUIT CARDS, CORRESPONDING SYSTEM AND COMPUTER PROGRAM PRODUCT

CROSS-REFERENCE TO RELATED APPLICATIONS

This application claims priority to Italian Patent Application No. 102019000009543, filed on Jun. 19, 2019, which application is hereby incorporated herein by reference.

TECHNICAL FIELD

The present disclosure relates to a method for generating personalized profile package data in integrate circuit cards, particularly in UICC (Universal Integrated Circuit Card) and more in particular in embedded UICC.

BACKGROUND

It is known that the eUiCC (embedded UICC) market environment comprises the generation of personalized profiles.

A Profile is a combination of a file structure, data and applications which are stored in an eUICC. A Profile Package is a Personalized Profile coded as an interoperable description format which is transmitted to an eUICC in order to load and install a Profile.

For instance the consortium SIMalliance defines an interoperable format to represent a Profile Package in the document "eUICC Profile Package:Interoperable Format Technical Specification", available at the URL http://simalliance.org/wp-content/uploads/2015/03/Profile-interoperability-technical-specification_V1-0.pdf. Such interoperable format represents the structure of data to be built by the Profile Maker and to be loaded in the eUICC card in order for the eUICC to be personalized according to the content of the Profile Package. The Profile Maker is an external entity, i.e. communicates data via a communication channel to a SM-DP entity (Subscription Manager-Data Preparation), in charge of creating the Profile Package based on the MNO (Mobile Network Operator) requirements, protecting the Profile Package from modification and/or content access.

The entity, such as the Profile Maker entity, SM-DP entity or MNO entity, corresponds to a subject performing operations, usually by means of one or more computer, involving handling and exchanging data, such entities being usually coupled for communication by communication network, e.g. the Internet, or communications channel.

A distinction may be traced among Profile Creator, Profile Maker and SM-DP. The Profile Creator may be the entity producing the master profile, the Profile Maker may be the entity generating profile data and using them to create personalized profiles, bundled in one or more batches, while the SM-DP may receive the batches and store the profiles contained in them. These entities may be separated entities or may be merged, e.g. the Profile Creator and Profile Maker.

The Profile Package is defined in an ASCII text format, specifically ASN.1 (Abstract Syntax Notation One) and includes a set of fields to be personalized, i.e. in which are to be written values specific of a given card. A Profile Package can be used by systems (servers or eUICC cards) only after conversion into DER (Distinguished Encoding Rules) format, which is a hexadecimal format.

In FIG. 1 it is shown a schematic representation of an example of a system for the personalization of IC cards in which the eUICC card operates. Such system includes a plurality of entities, which performs operations on the data, and can be implemented on computer, in particular, server, which are interconnected through a communication network, i.e. such entities are hosted in nodes of such network.

With the numeric reference 50 is indicated the eUICC card, which for instance resides in a mobile phone, which is not shown in FIG. 1. With 51 is indicated an entity corresponding to a Mobile Network (MNO) operator which can issue a Profile Ordering PO command to a Profile Maker 54. Such Profile Maker 54, i.e. is an entity configured to prepare personalized Profile Packages 12a for respective cards, such personalized Profile Packages 12a being thus stored in the eUICC 50, for instance through an OTA (Over The Air) channel. The Profile Maker 54, as mentioned, is a profile making entity which provides personalization data in a data structure, in particular includes or makes available a personalization data table 11a better described in the following also with reference to FIG. 3. In the embodiment of FIG. 1 the Profile Maker 54 receives a Master Profile 12 provided from a Profile Creator 53, which in this case is a separate entity, although in variant embodiments, these two entities 54, 53 can be integrated in a same profile making entity, i.e., the same server or node of the system described. Thus personalization data and Master Profile are made available to the Profile Maker 54. The Profile Maker 54, which may reside on a server or a network node, may be then in communication with a Data Preparation 52 server or node which includes modules like an OTA RFM (Over The Air Remote File Management) engine and a Keys Manager. In a certain time the MNO 51 sends the Profile Order PO, the MNO 51 also sends a Profile Enabling PE command to a Secure Routing server 56, which is configured to secure routing of profiles and sends a Profile Download command PDE to the UICC card 50, thus enabling download and storing of the personalized Profile Package 12a in the eUICC card 50.

The UICC card 50 is stored in a remote communication device equipment 55, which in the example shown includes a LPA (Local Profile Assistant) module 55a, which, in a manner known per se, loads the personalized Profile Package 12a in the UICC card. In variant embodiments, in particular in M2M (Machine to Machine) contexts transmission can take place over an HTTP connection between the server 52 and the eUICC 50 directly.

In FIG. 2 it is shown a flow diagram representing a method for the generation of a personalization profile package indicated with the reference 100. In FIG. 3 are shown schematically objects and entities such as a personalization data table 11a and a personalized Profile Package 12a which are employed in the steps of such method. With 105 is indicated an operation of providing, at the Profile Maker 54, in particular from the Profile Creator 53, a master Profile 12, e.g. a profile file or template in which the Profile Package is stored. Such Profile Package is an ASCII text in ASN.1 format. This master Profile file 12 is written by a profile designer at the Profile Maker 54, which, on the basis of the eUICC interoperable format mentioned above, writes Profile Elements in ASN.1 language according to the necessities of the set of cards 50 to be personalized to which also the table 11a refers.

Thus, such ASCII Profile Package file 12 through such ASN.1 file is written to include a plurality of p fields to be personalized $F_1 \ldots F_k \ldots F_p$, k being the index of the generic field $F_k$, which are in correspondence with a subset or all of the personalization fields $T_1 \ldots T_m$ in the personalization table 11a and in which the personalization values $V_{ij}$ in corresponding personalization fields $T_1 \ldots T_m$ can be written, as better explained below. These fields to be personalized $F_1 \ldots F_k \ldots F_p$ in the Profile Package file 12 accept hexadecimal values and usually are initialized (prior the substitution operation 115 described in the following) with an initialization value, e.g. a default hexadecimal value.

The method 100 then includes an operation 110 of providing a personalization data table 11a. In the example described such personalization data table 11a is a simple table data structure organized in rows and columns. Such data table 11a includes a plurality of records $R_1 \ldots R_n$, corresponding to the rows of the personalization data table 11a. Each i-th record $R_i$ corresponds to a determined personalized profile for a set comprising a number n of cards 50 to be personalized with a respective personalized Profile Package 12a. In a personalization procedure, for instance the number n of profiles, and thus the number n of records R1 . . . Rn can amount to one million.

Each column of the personalization data table 11a include then personalization fields $T_1 \ldots T_m$, m being the number of fields in the table 11a, in which a different type of personalization value is stored. In some fields among the personalization fields $T_1 \ldots T_m$ can be stored the Crypto Keys, in other fields the PIN numbers, the Unique Id and other personalization data. A given profile data to be sent to a card 50 corresponds to a personalization record $R_i$, the personalization values of that specific given profile are stored in these fields. The generic personalization field is indicated by $T_j$, j being the index of the personalization fields going from 1 to m. Thus the table 11a is a matrix of values $V_{ij}$ in the cells corresponding to the records $R_1 \ldots R_n$ and fields $T_1 \ldots T_m$.

Then in a step 115 the Profile Package 12a is obtained substituting the desired personalization data from table 11a in the master Profile file 12.

Here below in Table 1 is supplied an example of a portion of such Profile Package in the Profile Package file 12, which is also shown in FIG. 3.

TABLE 1

```
value02 ProfileElement ::= mf : {
  mf-header {
    mandated NULL,
    identification 2
  },
  templateID{2 23 143 1 2 1},
  mf{
    fileDescriptor : {
      lcsi '05'H,
      pinStatusTemplateDO '01810A'H
    }
  },
  ef-iccid{
    fileDescriptor : {
      lcsi '05'H,
      shortEFID '10'H
    },
    fillFileContent : '980000000000000040F5'H
  },
  ef-dir{
    fileDescriptor : {
      fileDescriptor '42210026'H,
      lcsi '05'H,
      efFileSize '98'H
    },
    fillFileContent :
'61184F10A0000000871002F310FFFF89080000FF50045553494D'H,
    fillFileOffset : 12,
    fillFileContent :
'61184F10A0000000871004F310FFFF89080000FF50044953494D'H,
    fillFileOffset : 12,
```

As shown for instance the Elementary File ef-iccid dedicated to the ICCID (Integrated Circuit Card ID) value includes an instruction fillFileContent(argument) which argument represents a customizable fixed-length field, i.e. a field to be personalized, which in FIG. 2 is indicate with F1, corresponding to the personalization field for the ICCID value in the data table 11a. In the example the field to be personalized for the ICCID is set to the initial value 980000000000000040F5'H, the H indicating a hexadecimal value. The Elementary file Ef-dir includes two other customizable fields F2, F3 also in correspondence of the instruction fillFileContent. In these cases an offset value is added after the instruction fillFileContent to allow writing the value in a file at a specified offset position. Thus it is important to observe that the ASCII Master Profile file 12 allows writing the personalization values in files and allows writing in such files at given offset positions. These methods and procedures are known per se and are detailed for instance in the already mentioned SIMalliance reference document "eUICC Profile Package:Interoperable Format Technical Specification", which in particular at page 19 FIG. 2 details the processing of the 'File' type just summarized.

Thus, then in an operation 115 the Master Profile 12 file is personalized in order to obtain a set of personalized Profile Packages 12a file substituting in the fields to be personalized $F_1 \ldots F_k \ldots F_p$ the value in the corresponding personalization fields $T_1 \ldots T_p$, as mentioned a subset or all of the personalization fields $T_1 \ldots T_m$ in the data table 11a, of a record $R_i$ corresponding to the specific profile in which the personalized Profile Package 12a must be stored.

Thus, a personalized Profile Package file 12a is obtained by the substitution operation 115.

Subsequently, since only Profile Packages expressed in hexadecimal code can be used and executed by the eUICC card 50, the personalized Profile file 12a is converted in a hexadecimal Profile Package file, by a DER conversion operation, not shown in the figure, formed by sequences of hexadecimal codes.

Then in a step 120 the personalized Profile Package 12a is protected by an encryption using an encryption key $K_G$. All the personalized profiles 12a are protected (encrypted), each one with its own respective encryption key $K_G$, obtaining personalized protected files 12e.

Subsequently in a step 125 the protected personalized files 12e are put together in a respective batch according to the specific SM-DP or SM-DP+ OTA platform specifications of the Data Preparation 52 to which are to be sent. Such batch of protected personalized files 12e results in a single output file 13, which is then sent to the Data Preparation entity 52. The Data Preparation 52 in an operation 130 sends the output file 13 to the cards 50 as shown in FIG. 1, in particular through the Secure Routing server 53.

This method to provide generation of personalized profile package data determines that even if a module, machine or communication device, can host more than one personalized profile, even if they have in common 95-98% of data, those profiles that differ in few KB need to be stored and transferred as if they were completely different.

Also since there is a maximum time allowed for loading and activation defined by 3GPP, GSMA specifications (e.g. one minute), and since a profile is transferred through ISO interface by means of APDUs, this is a practical limit to the profile maximum size (e.g. for one minute of maximum time approximately 250 KB).

On the basis of the foregoing description, the need is felt for solutions which overcome one or more of the previously outlined drawbacks.

SUMMARY

Embodiments provide method for generating personalized profile package data in integrate circuit cards. Further embodiments provide a related system for the personalization of integrated circuit cards module as well as a corresponding related computer program product, loadable in the memory of at least one computer and including software code portions for performing the steps of the method when the product is run on a computer.

As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

Embodiments provide a solution to the above mentioned problem. Further embodiments provide a method for generating personalized profile package data in integrate circuit cards including making available a table comprising a plurality of data records corresponding to a plurality of profile data, each record comprising a plurality of personalization fields to store different types of personalization values to a profile making entity, making available a master profile comprising fields to be personalized corresponding to one or more of said fields to store different types of personalization values to said profile making entity, combining one or more data records comprised in said table with the master profile inserting personalization values in fields to be personalized to obtain respective personalized Profile packages, said operation of combining using an offset table indicating for each personalization field of a record the offset address of the master profile at which the personalization value is to be inserted, wherein said method includes coding said one or more data records to be combined with the master profile with a type length value coding, associating the type to the personalization field indication and the value and length respectively with the value content and length of the value content of the personalization field, obtaining encoded data records, applying said type length value coding to said offset table, associating the type to the personalization field and the value and length respectively with the offset address content and its length, obtaining encoded offset, combining for each record said encoded data record and data offset in an encoded personalization record, making available said master profile to a communication device hosting the integrated circuit card, transmitting said encoded personalization record from a data preparation entity to the respective integrated circuit cards, extracting the encoded data record and the corresponding encoded offset and performing a type length value decoding on said encoded data record and the corresponding encoded offset and combining the decoded personalization record with the master profile at the communication device.

In variant embodiments, the method includes making available said master profile to a communication device hosting the integrated circuit card includes having said master profile pre-stored in said communication device.

In variant embodiments, the method includes the further steps of, after said combining for each record said encoded data record and data offset in an encoded personalization record, protecting said encoded personalization record performing an encryption with an encryption key, obtaining an encrypted file, transmitting said encrypted file to the data preparation entity and sending said encrypted file as data preparation entity output file to the communication device hosting the integrated circuit card, decrypting said encrypted file at said communication device to obtain unencrypted encoded personalization record, performing said step of extracting the encoded data record and the corresponding encoded offset on said unencrypted encoded personalization record.

In variant embodiments, the method includes providing said master profile in a type length value encoded format, in particular DER, parsing said master profile to identify profile elements in said master profile and identifying their start position and end position in the master profile, generating a range table, comprising a record for each profile element, including fields corresponding to said start position, end position and a profile element offset, then in the case data are inserted in the master profile in a given profile element (determining a shift of a given value, updating said start position, end position and profile element offset in the range table as a function of said shift given value, in particular summing said shift given value to each start position, end position and profile element offset subsequent to the insert position of said data.

In variant embodiments, the method includes performing a step of modifications of the derived master profile, includes evaluating if the original offset table, includes addresses AV which are greater of the address of the start position of the profile element following the given profile element $PE_r$ previously modified, in the negative the personalization data and the corresponding offset table can be can be reused to obtain a personalization profile, while in the positive, for each personalization field to which is associated address value of the offset table higher than the start position the given shift is added to the address value to combine the personalization data in the derived master profile to obtain the personalization profile.

In variant embodiments, said parsing for segmentation and Range Table calculation are performed once to store that Range Table, or at runtime when requested.

In variant embodiments, the method includes that said encryption key is associated to a hash of the master profile or a to product name or identifier identifying the file for the master profile.

The present disclosure provides also solutions regarding a system for the personalization of integrated circuit cards, in particular eUICC cards, including a profile making entity, a Mobile Network Operator and a Data Preparation entity, configured to generate personalized Profiles according to the method of any of the above described embodiments.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 4 are denoted by the same references previously used in such Figures; the description of such previously described elements will not be repeated in the following in order not to overburden the present detailed description.

Figure 2:
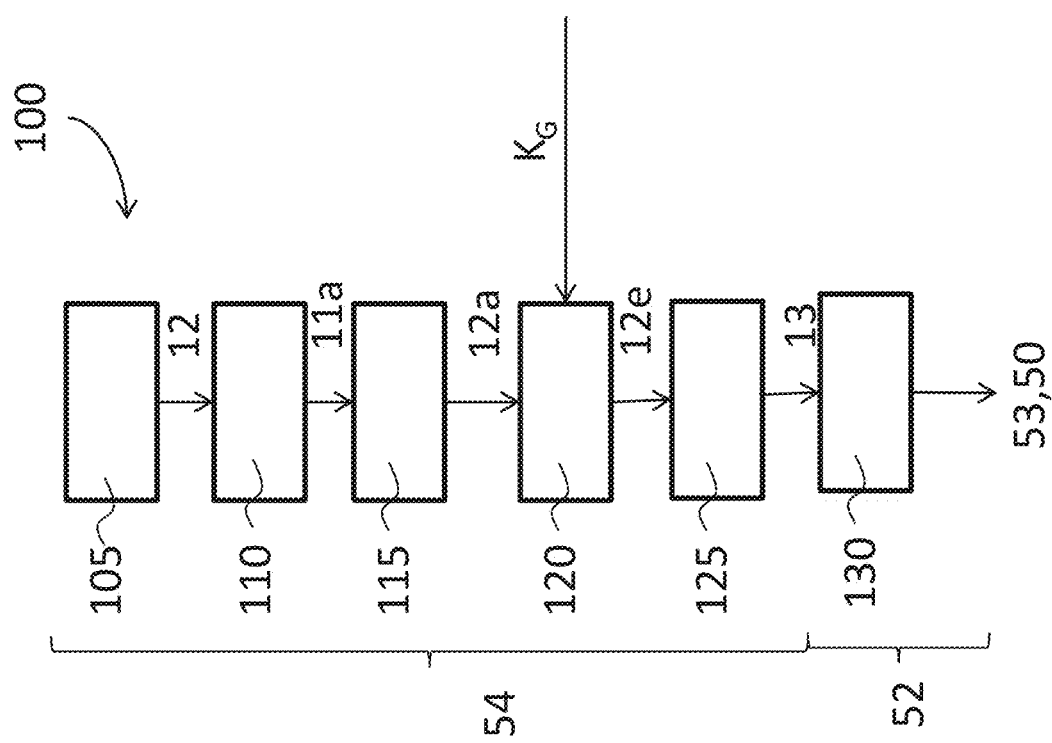
FIG. 2 shows a flow diagram of a method for generating personalization profile package.
Figure 3:
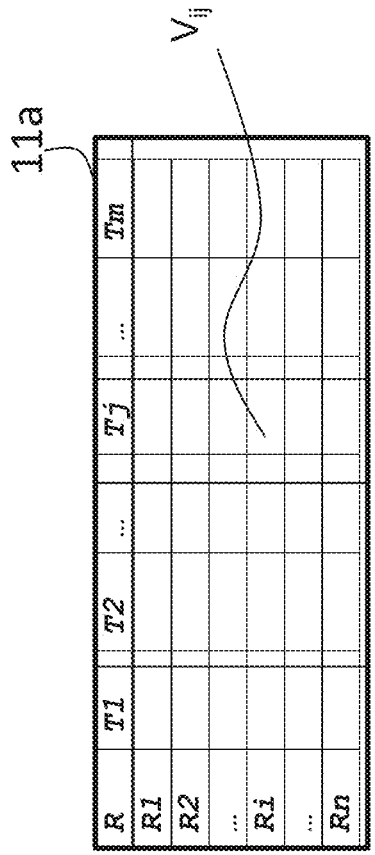
FIG. 3 shows schematically objects and entities such as a personalization data table and a personalized profile package.

The solution here described substantially, in comparison with the method for the generation of personalized profile package in integrated circuit cards described with reference to FIGS. 2 and 3, provides that the personalization data and the Master Profile are not combined into an output file, which is then handled by the SM-DP server, but they remain separated.

The integrated cards, e.g., eUICCs, have the Master Profile already available within their memory, i.e. pre-stored or previously loaded during a 'campaign' or a preventive loading (in these cases the loading is performed in background, without time limit).

The personalization data and an offset table that defines the exact target position of personalization values, within the profile, are sent to integrated cards, formatted in a defined format, preferably protected by means of an encryption key, e.g. derived by a Master Profile hash, or a product name or identifier, encrypted with a key (preshared, derived . . . ).

The personalization data are inserted in the Master Profile at the local device using the offset table.

Figure 4:
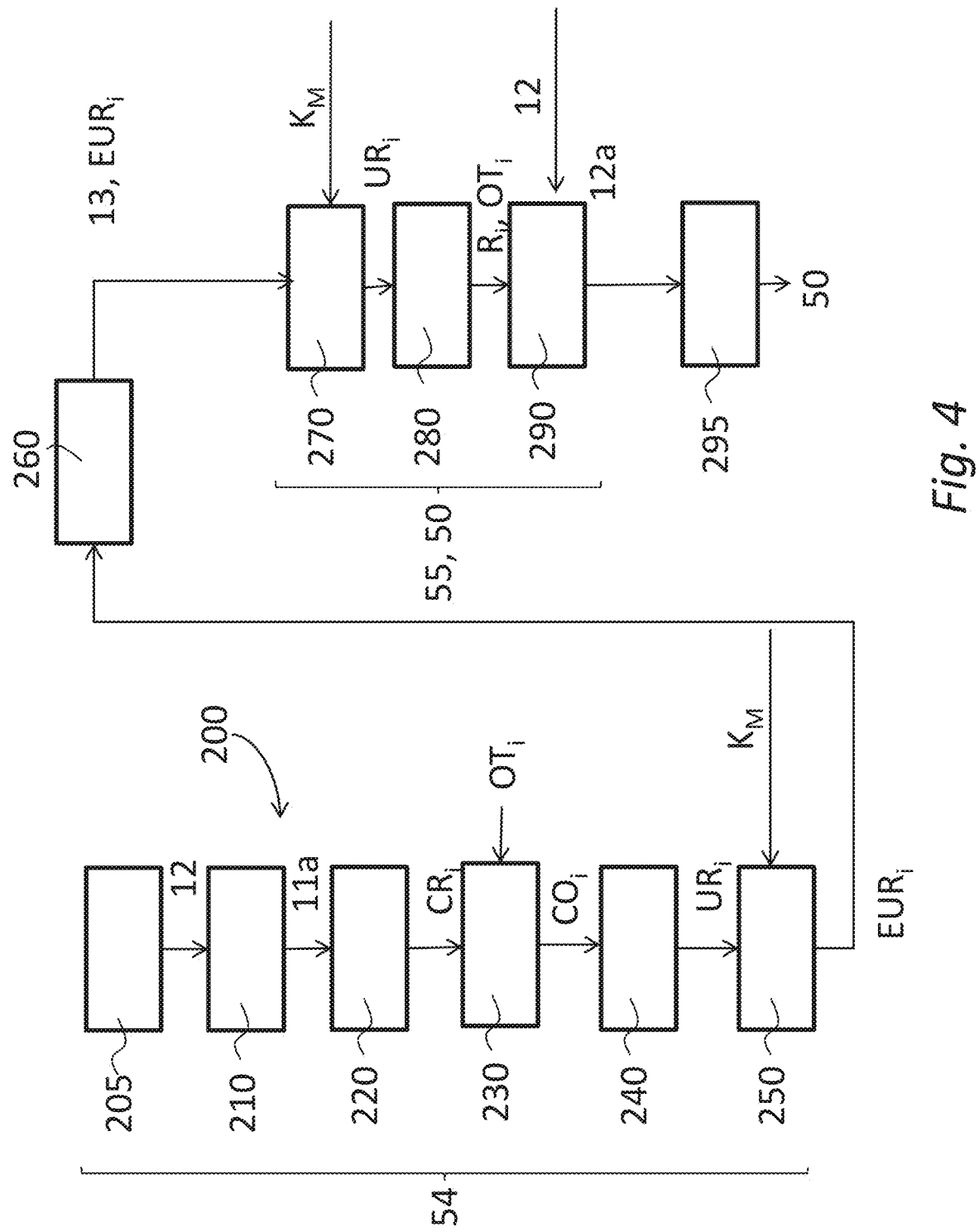
FIG. 4 shows a diagram flow illustrating an embodiment of the method here described.

In FIG. 4 it is thus shown a diagram flow representing an embodiment 200 of the method of personalized profile packages generation here described.

With 205 is indicated an initial operation of making available a Master Profile 12 to a communication device 55 hosting the integrated circuit card 50. The communication device 55 may be a device operating with Industrial integrated cards, typically unattended, i.e. without the interaction of an End User. Thus the operation regarding the managing of software and profiles, e.g. Load/Enabled/Disable/Delete are issued by a remote server, representing the service provider, since the device performs these operations unattended, or otherwise may be a device with integrated, in particular, eUICC, Consumer cards, i.e. mobile phones, smartwatches, and similar devices which are typically attended. Therefore, operations for managing software and profiles are issued by the local device, representing the user intent. The device performs these operations attended, i.e., with the interaction of an End User, and usually includes a LPA (Local Profile Assistant) providing LPA services, such as Profile download or Profile management, to the card 50.

The Master Profile 12 is originated by the operation 205 of providing, at the Profile Maker 54, in particular from the Profile Creator 56, such Master Profile 12.

Such operation 205 may include having said Master Profile 12 pre-stored in said communication device 55 or card 50. The Master Profile 12 in variant embodiments can be previously loaded during a 'campaign' or a preventive loading (in these cases the loading is performed in background, without time limit).

With 210 is indicated an operation of providing a personalization data table $11a$, which corresponds to operation 110 in FIG. 2, i.e. the data table $11a$ includes a plurality of records $R_1 \ldots R_n$, corresponding to the rows of the table $11a$. Each i-th record $R_i$ corresponds to a determined i-th integrated circuit card 50 in a set comprising a number n of cards 50 to be personalized with a respective personalized Profile Package $12a$ and each column of the personalization data table $11a$ include then personalization fields $T_1 \ldots T_m$. A given profile Package data to be sent to a card 50 corresponds to a personalization record $R_i$, the personalization values of that specific given profile are stored in these fields. The generic personalization field is indicated by $T_j$, being the index of the personalization fields going from 1 to m.

Figure 5:
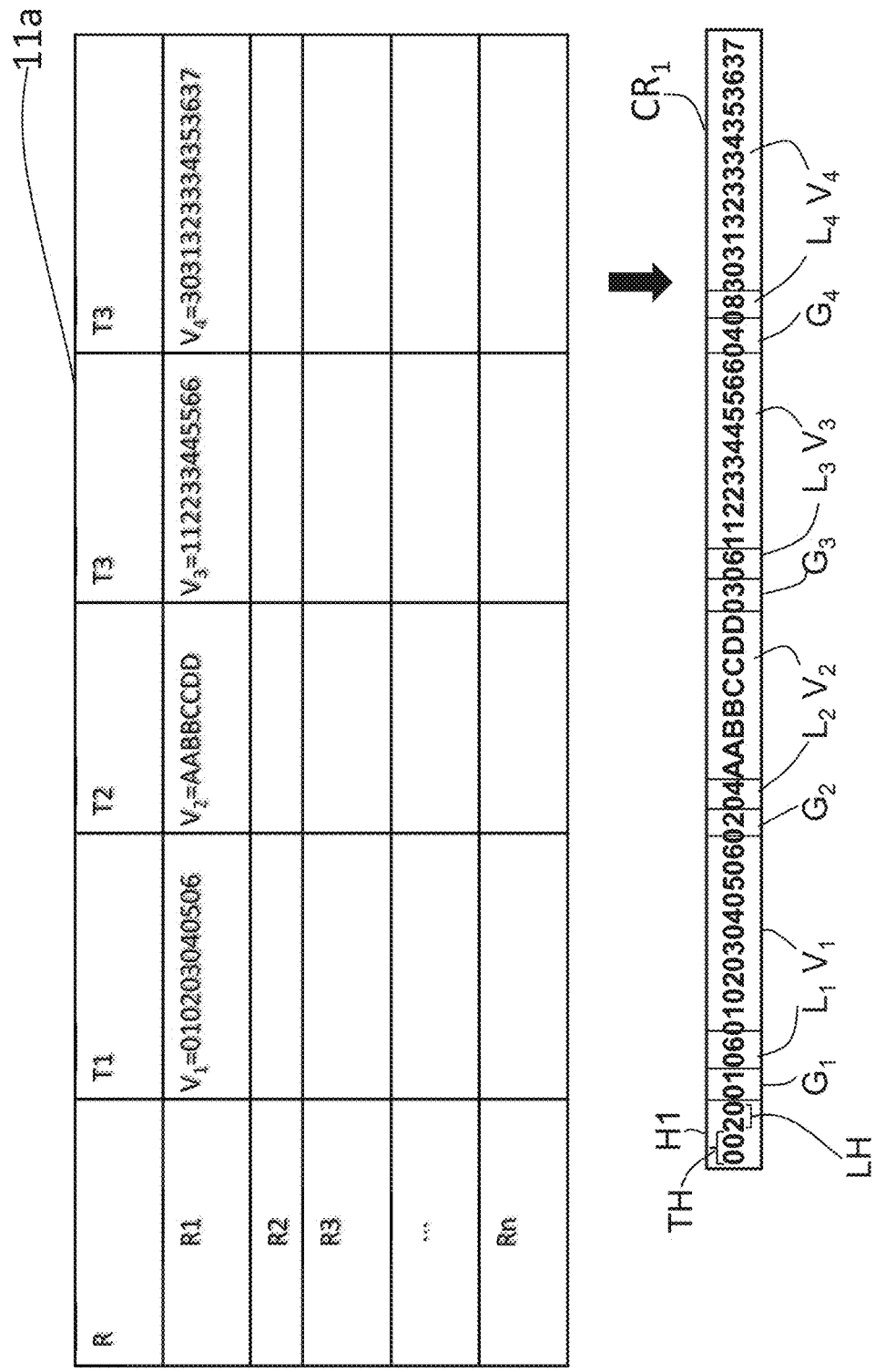
FIG. 5 shows a first example of coding steps according to the method here described.

In FIG. 5 it is shown an example with $m=4$, and values $V_1 \ldots V_4$ (for simplicity only the $V_j$ notation is used to indicated the values, although taking in account all the rows, i.e. records, of table $11a$, it should be $V_{ij}$, i.e. $V_{11} \ldots V_{14}$) in the fields $T_1 \ldots T_4$ of the personalization record $R_1$, corresponding to given profile data to be sent to a card 50.

In a step 220 then it is performed the coding of one or more data records $R_1 \ldots R_n$, e.g. i-th record $R_i$ or in the example, i=1, thus first record $R_1$, to be combined with the Master Profile 12 to obtain the requested personalized profile package data, with a type-length-value (TLV) coding, wherein the TLV comprises associating: the type or tag or identifier, indicated with $G_j$ in FIG. 5, to the personalization field label $T_1 \ldots T_m$, i.e. the type $G_j$ identifies the field $T_j$, and the length $L_j$ with the length of the values $V_1 \ldots V_m$ ($V_1 \ldots V_4$ in FIG. 5) of the personalization fields $T_1 \ldots T_m$, while the value $V_j$ in the TLV coding corresponds to the value $V_j$ itself in the personalization field of course the same value, thereby obtaining one or more encoded data records $CR_1 \ldots CR_n$. In the example of FIG. 5 record $R_1$ is encoded as encoded data record $CR_1$.

As shown in FIG. 5, the encoded data record $CR_j$, specifically $CR_1$, includes a head H to identify the beginning of an encoded data record CR, which includes a head tag TH, e.g. 00, and a head length LH, e.g. 20, corresponding to the total length of the values $V_1 \ldots V_m$, the encoded data record $CR_j$, and then a string coding the first field $T_1$ as type tag $G_1$, length $L_1$ of the value $V_1$ inside the field $T_1$ and the value $V_1$ itself. All the fields $T_1 \ldots T_m$ are coded accordingly forming a sequence of corresponding type $G_j$, length $L_j$, value $V_j$ for $j=1 \ldots m$, m being 4 in the example shown.

Figure 6:
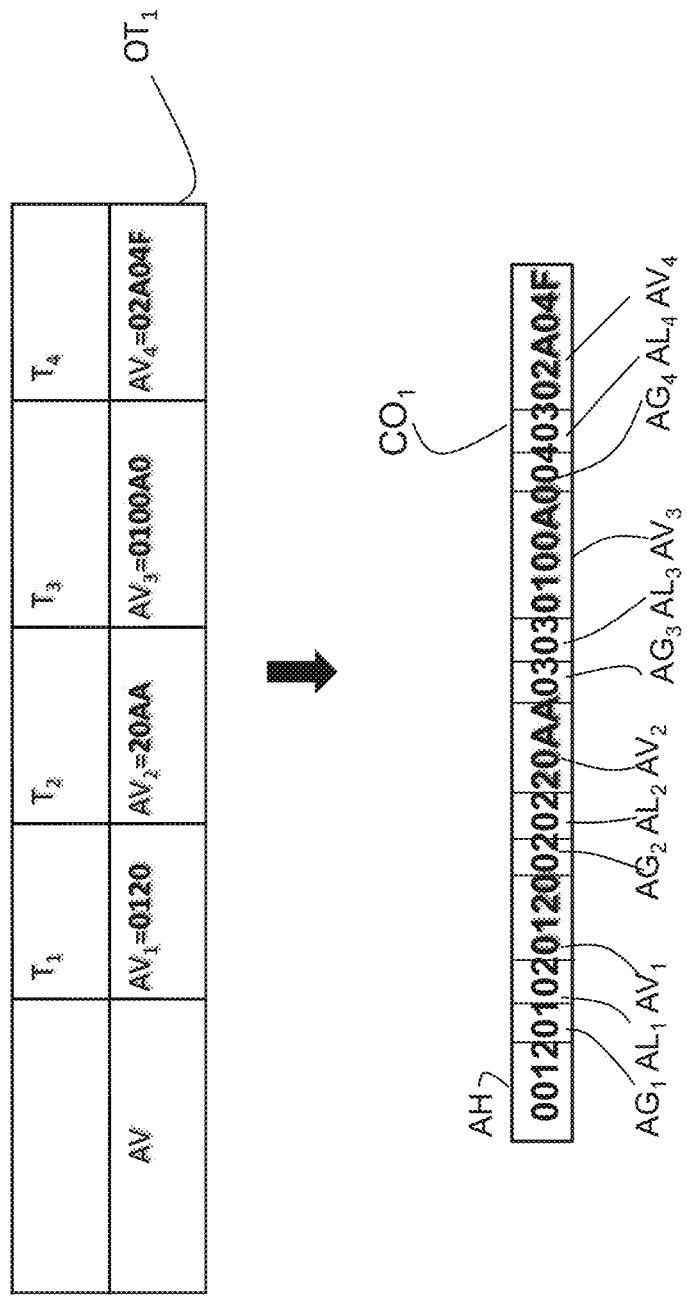
FIG. 6 shows a second example of coding steps according to the method here described.

In step 230, it is provided an offset table $OT_i$, which, for the given i-th subscription or card 50, indicates for each field to be personalized $F_k$, i.e., personalization field $T_k$, a corresponding offset value $AV_k$, i.e. an address value of the Master Profile 12, in ASN.1 or in DER hexadecimal format, to which the value $V_k$ in the personalization field $T_k$ is to be inserted. The offset table contains a tag identifier for each required personalization field $T_k$, for instance the value/label of the same personalization field $T_k$. To such offset table OT, it is also applied said type-length-value coding, associating a type AG to the personalization field label $T_j$ and the value length $AL_j$ and value $AV_j$ to the offset address content $AV_j$, obtaining an encoded offset string $CO_i$ for a given record $R_i$, i.e. a given profile for the given subscription or card 50. In the example in FIG. 6, the offset table $OT_i$, which is here represented as an unique table for all the records of table 11a, has in row $OT_1$ the offset value corresponding to record $R_1$ and it is TLV encoded in the encoded offset string $CO_1$, with a corresponding offset header AH, which also contains a header tag, e.g. 00, and a total length LT, 12 in the example, at the beginning marking the string as an offset string.

Figure 7:
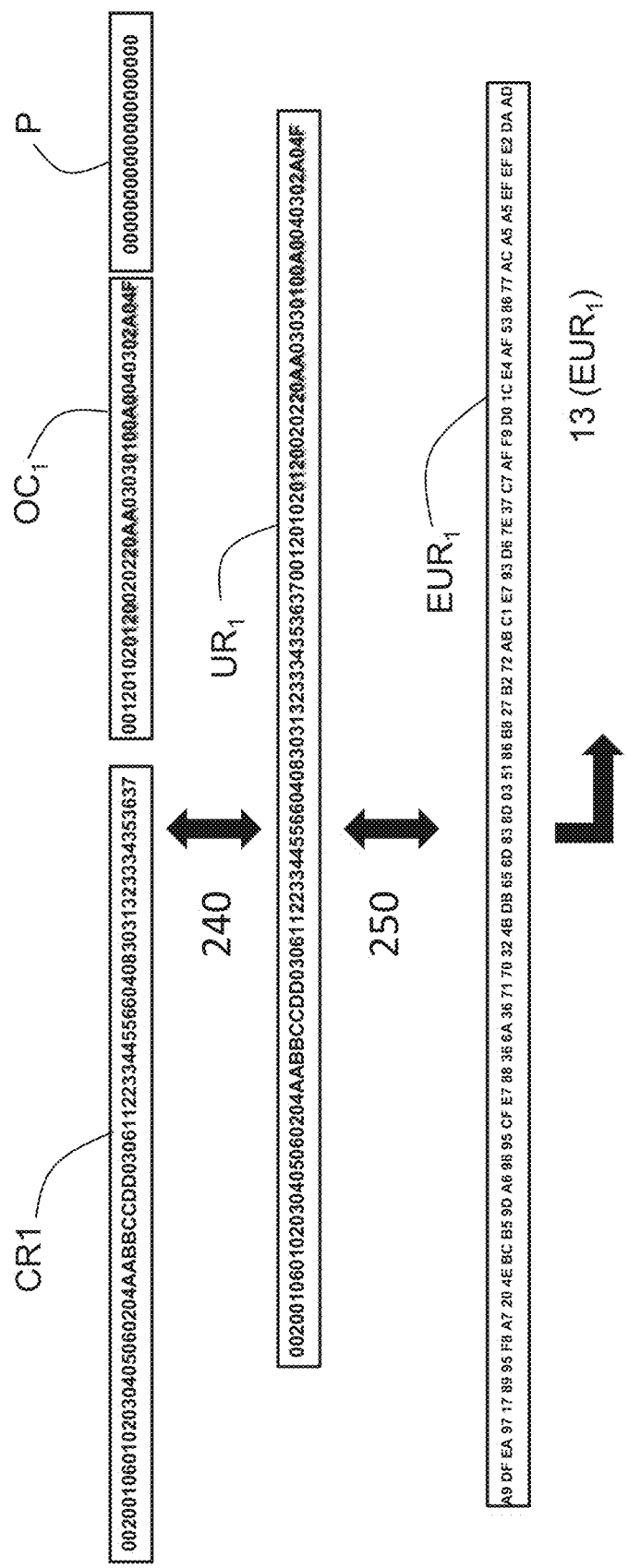
FIG. 7 shows a second example of further steps according to the method here described.

Then, in a step 240 the string of the encoded data record $CR_i$ and the corresponding string of the encoded offset $OC_i$ are combined, in particular, concatenated in a single concatenated string $UR_i$ ($CR_1$, $OC_1$, $UR_1$ in the example of FIG. 7), representing the personalization data to be transmitted as output file from the Profile Maker, which can correspond to the eUICC Maker (EUM), 54 and from the preparation server SM-DP 52. Padding bits P, in particular a sequence of logic zero, can be also concatenated at the end of the single concatenated string $UR_i$, to conform to given string size requirements.

In a step 250 is then performed encryption of the single concatenated string $UR_i$ representing the personalization data with an encryption key $K_M$, e.g. derived by Master Profile hash, or a product name or identifier, encrypted with a key (preshared, derived . . . ). An encrypted personalization data $EUR_i$ is obtained.

Figure 1:
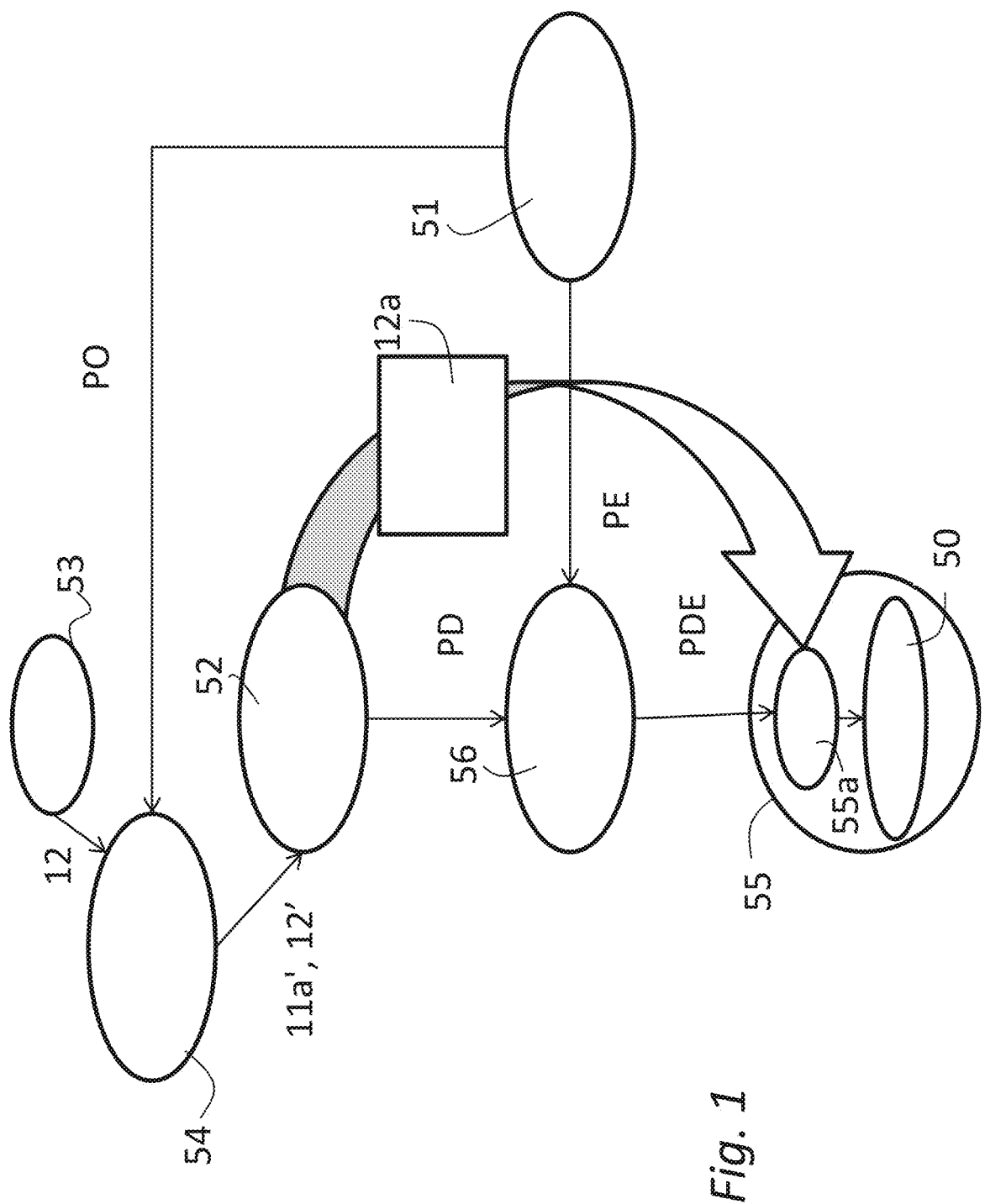
FIG. 1 shows a schematic representation of an example of a system for the personalization of IC cards in which the eUICC card operates.

Then in a step 260 the encrypted personalization data $EUR_i$ is sent, via the data preparation server 52, to the card 50 in the device 55 as correspondent of the output file 13 supplied by the data preparation server 52 shown in FIG. 1.

At the device 55 is then performed an operation 270 of decrypting—with the encryption key $K_M$, which is pre-shared or derived from the Master Profile 12 or from a product name or identifier known by the card 50 or from the product—said encrypted personalization data $EUR_i$ file to obtain the unencrypted encoded personalization record $UR_i$, which includes the encoded data record $CR_i$ and the corresponding string of the encoded offset $OC_i$, which are then in turn extracted from encoded personalization record $UR_i$ according to the known operations of construction of the Profile Package.

Thus, in a step 280 the encoded data record $CR_i$ and the corresponding string of the encoded offset $OC_i$ are extracted, TLV decoded and used in an operation 290 corresponding to operation 115 in FIG. 2 to be combined with the Master Profile 12 to obtain the personalized profile, e.g. Profile Package, 12a. The Master Profile 12 is usually already in DER format and the values $V_j$ and the encoded offset $OC_i$ is configured from the Profile Maker 52 to indicate the position to insert directly in the DER formatted Master Profile 12 the values $V_j$ corresponding to the fields $F_j$. In other words, it is provided calculating $OC_i$ an offset table for the given i-th profile indicating for each field $F_i$ to be personalized a corresponding offset in the hexadecimal profile, I in particular DER, converted Master Profile 12, the operation of substituting said personalization values $V_j$ from said personalization fields in the corresponding fields to be personalized $F_j$ including substituting such values directly $V_j$ in the fields to be personalized in such file in hexadecimal format at the location indicated for each personalized field by the corresponding offset in the offset table $OC_i$.

The personalized profile 12a, is then loaded in the card 50 in a step 295.

According to a further aspect of the solution here described, the method can also include, further to procedure 100, providing said Master Profile 12 in a type length value encoded format, in particular DER, and parsing such Master Profile 12 to identify Profile Elements in said master profile 12 and their start position and end position in the Master Profile 12 in order to allow, besides substitution of personalization values in the fields $F_1 \ldots F_p$ of the master profile 12, also substitution of entire parts/sections/fragments of the Master Profile 12.

Figure 8:
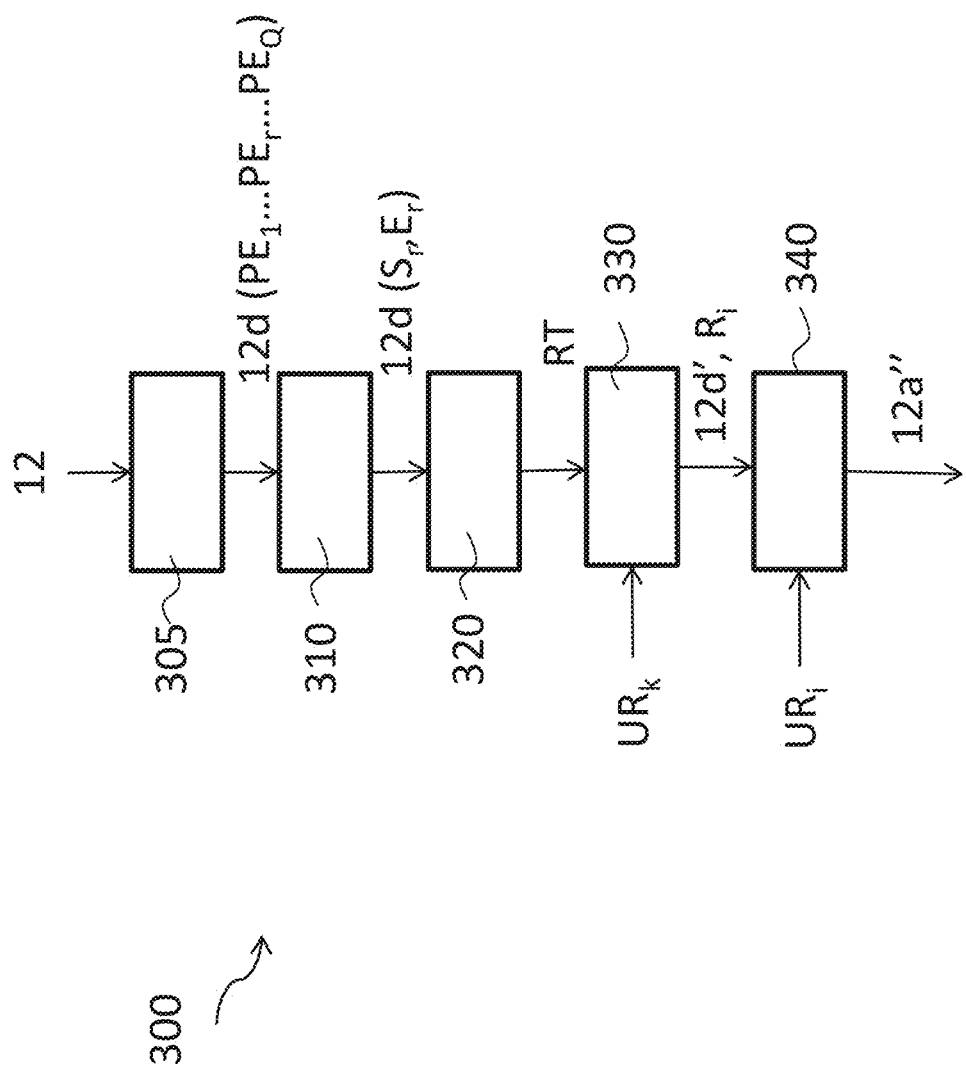
FIG. 8 shows a diagram flow illustrating a further embodiment of the method here described.

As shown in the flow diagram of FIG. 8, thus a further profile generating procedure 300 includes in a step 305 of providing at the card 50 said Master Profile 12 in a type length value encoded master profile, i.e. a segmented profile 12d, in particular DER encoded, with different Q Profile Elements $PE_1 \ldots PE_r \ldots PE_Q$, each coded with a type tag t, a value length l and profile value v, corresponding to the content of the Profile Element.

Then, in a step 310, said segmented profile 12d is parsed to identify start position $S_r$ and end position $E_r$ of each Profile Element $PE_r$.

Figure 9:
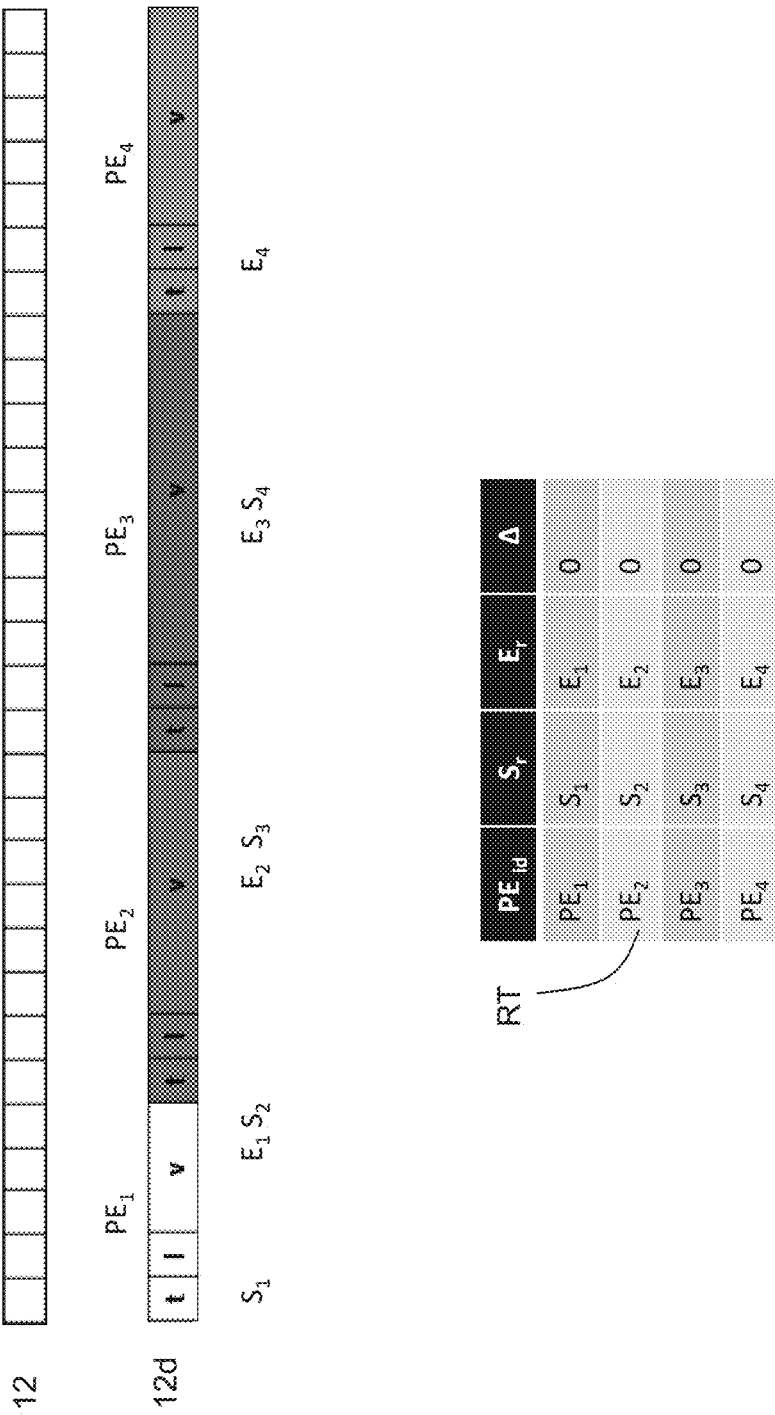
FIG. 9 shows a first example of coding steps according to the further embodiment of method here described.

In a step 320 a range table RT is built having as records, in particular in rows, the Profile Elements $PE_1 \ldots PE_r \ldots PE_Q$, identified by a respective Profile Identifier $PE_{Id}$, and for each Profile Element $PE_r$ fields corresponding to such start position $S_r$ and end position $E_r$ and corresponding to a profile element offset $\Delta$, as shown in FIG. 9.

Master profile parsing 310 for segmentation and Range Table RT calculation 320 can be performed once to store that Range Table RT, or at runtime when requested.

If in a step 330 data are inserted in the segmented master profile 12d, e.g. in a given profile element $PE_r$ determining a shift of a given value x, from the segmented master profile 12d is obtained a derived master profile 12d', and the range table RT is updated to a derived range table RT', updating the start position, end position and profile element offset $\Delta$ as a function of said shift given value x, i.e. summing said shift given value x to each start position $S_r$, end position $E_r$ and profile element offset $\Delta$ subsequent to the insert position of said data.

Figure 10:
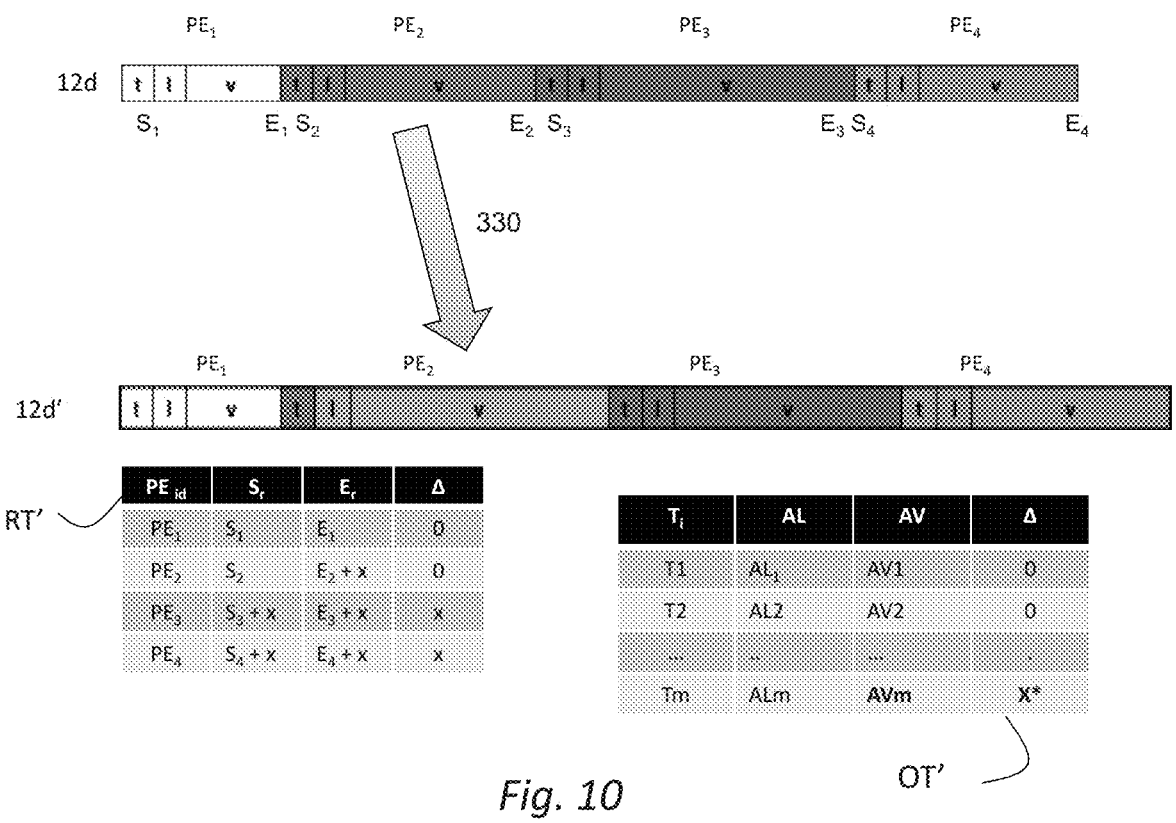
FIG. 10 shows a second example of coding steps according to the further embodiment of the method here described.

A step 340 of subsequent modifications of the derived master profile 12d', for instance adding personalization data $R_i$ with a respective derived offset table $OT'_i$, includes evaluating if the original offset table $OT_i$ includes addresses AV which are greater of the address of the start position $S_{r+1}$ of the profile element $PE_{r+1}$ following the given profile element $PE_r$ previously modified. In the negative the personalization data $R_i$ and the corresponding offset table $OT_i$ can be can be reused with a minor adaptation to obtain a personalization profile 12a'. For each personalization field $T_j$ to which is associated address value $AV_j$ of the offset table $OT_i$ higher than the start position $S_{r+1}$, the given shift x value shall be added to the address value AV to combine the personalization data in the derived master profile 12d' to obtain the personalization profile 12a'. This can implemented by building a corresponding derived offset table OT', having a further profile element offset Δ column with respect to original offset table OT, indicating whether a shift x has to be added for a given personalization field $T_j$, a shown in FIG. 10. In this case the profile element offset Δ column includes incremental shifts, i.e. in the last row is indicated a total shift X* which is the summation of the given shifts introduced in the personalization fields $T_j$.

The embodiment just described allows extending the solution to cases that involve a not trivial change of the Master Profile.

The described solution allows thus saving maximum space, especially in case of multiple profiles derived from the same Master Profile.

Also, the output file size is drastically reduced.

The solution here described improves reliability as the personalization data can be strictly associated to a specific Master Profile, which is in turn needed to decrypt the personalization data and offset table.

The solution is also useful for testing domain, since when several (test) profiles have to be loaded to perform a Test Suite, loading time is further felt as crucial Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method for generating personalized profile package data, the method comprising:
    providing a table comprising a plurality of data records ($R_1 \ldots R_n$) corresponding to a plurality of profile data, wherein each data record of the plurality of data records ($R_1 \ldots R_n$) comprises a plurality of personalization fields ($T_1 \ldots T_m$) to store different types of personalization values ($V_1 \ldots V_m$) to a profile making entity, and wherein two different data records of the plurality of data records ($R_1 \ldots R_n$) correspond to two different profile packages;
    providing a master profile comprising fields to be personalized ($F_1 \ldots F_k \ldots F_p$) corresponding to one or more of the data records ($R_1 \ldots R_n$) to store the different types of personalization values ($V_1 \ldots V_m$) to the profile making entity;
    combining the one or more of the data records ($R_1 \ldots R_n$) in the table with the master profile by inserting the personalization values ($V_1 \ldots V_m$) in the fields to be personalized ($F_1 \ldots F_k \ldots F_p$) to obtain respective personalized profile packages, wherein combining comprises using an offset table indicating for each personalization field ($F_k$) of a data record of the plurality of data records ($R_1 \ldots R_n$) an offset address (AV) of the master profile at which the personalization value ($V_1 \ldots V_m$) is to be inserted;
    coding the one or more of the data records ($R_1 \ldots R_n$) to be combined with the master profile with a type length value coding, wherein coding comprises associating a tag ($G_j$) to a personalization field ($T_j$), a length ($L_j$) of a value ($V_j$) inside the personalization field ($T_j$), and the value ($V_j$) itself, thereby obtaining encoded data records ($CR_i$);
    applying the coding to the offset table, wherein applying comprises associating a tag (AG) to the personalization field ($T_j$), a value length ($AL_j$) of the value ($V_j$) to an offset address content ($AV_j$), thereby obtaining encoded data offset ($CO_i$);
    combining for each record ($R_i$) the encoded data record ($CR_i$) and the data offset ($OC_i$) in an encoded personalization record ($UR_i$);
    providing the master profile to a communication device hosting an integrated circuit card;
    transmitting the encoded personalization record ($UR_i$) from a data preparation entity to the integrated circuit card;
    extracting the encoded data record ($CR_i$) and the encoded offset ($OC_i$) and performing a type length value decoding on the encoded data record ($CR_i$) and the encoded offset ($OC_i$); and
    combining the encoded personalization record ($UR_i$) with the master profile at the communication device.

2. The method of claim 1, wherein providing the master profile to the communication device hosting the integrated circuit card includes pre-storing the master profile in the communication device.

3. The method of claim 1, wherein after obtaining the encoded personalization record ($UR_i$), the method further comprising:
    encrypting the encoded personalization record ($UR_i$) with an encryption key ($K_M$), thereby obtaining an encrypted file (EURi);
    transmitting the encrypted file (EURi) to the data preparation entity and sending the encrypted file (EURi) as data preparation entity output file to the communication device hosting the integrated circuit card; and
    decrypting the encrypted file (EURi) at the communication device thereby obtaining unencrypted encoded personalization record (URi).

4. The method of claim 3, wherein the encryption key ($K_M$) is associated to a hash of a master profile or to a product name or an identifier identifying the file for the master profile.

5. The method of claim 1, wherein providing the master profile comprises providing the master profile in a type length value encoded format by:
    parsing the master profile to identify profile elements ($PE_r$) in the master profile and identifying their respective start positions ($S_r$) and end positions ($E_r$) in the master profile;
    generating a range table (RT) comprising a record for each profile element ($PE_r$), including fields corresponding to the start position, the end position and a profile element offset (Δ); and
    determining a shift of a given value (x) when data are inserted in the master profile in a given profile element ($PE_r$), updating the start position, the end position and the profile element offset (Δ) in the range table (RT) as a function of the shift given value (x).

6. The method of claim 5, wherein determining the shift comprises summing the shift given value (x) to each start position ($S_r$), end position ($E_r$) and profile element offset (Δ) subsequent to the insert position of the data.

7. The method of claim 5, further comprising performing modifications to a derived master profile by:
    evaluating whether the offset table includes addresses (AV) which are greater than the address of the start position ($S_{r+1}$) of the profile element ($PE_{r+1}$) following a given profile element $PE_r$ previously modified;

when negative, reusing the personalization data ($R_i$) and the corresponding offset table to obtain a personalization profile; and when positive, for each personalization field ($T_j$) to which an associated address value ($AV_j$) of the offset table is higher than the start position ($S_{r+1}$), adding a given shift (x) to the address value (AV) to combine the personalization data in the derived master profile to obtain the personalization profile.

8. The method of claim 5, wherein parsing comprises performing parsing for segmentation and range table calculation once a range table is stored, or at runtime when requested.

9. A method comprising:
providing, at a profile making entity, a table comprising a plurality of data records ($R_1 \ldots R_n$) corresponding to a plurality of profile data, wherein each data record of the plurality of data records ($R_1 \ldots R_n$) comprises a plurality of personalization fields ($T_1 \ldots T_m$) to store different types of personalization values ($V_1 \ldots V_m$), and wherein two different data records of the plurality of data records ($R_1 \ldots R_n$) correspond to two different profile packages;
providing, at the profile making entity, a master profile comprising fields to be personalized ($F_1 \ldots F_k \ldots F_p$) corresponding to one or more of the data records ($R_1 \ldots R_n$) to store the different types of personalization values ($V_1 \ldots V_m$);
coding, at the profile making entity, the one or more of the data records ($R_1 \ldots R_n$) to be combined with the master profile, wherein coding comprises associating a tag ($G_j$) to a personalization field ($T_j$), a length ($L_j$) of a value ($V_j$) inside the personalization field ($T_j$), and the value ($V_j$) itself, thereby obtaining encoded data records ($CR_i$);
applying, at the profile making entity, a coding to an offset table, wherein applying the coding comprises associating a tag (AG) to the personalization field ($T_j$), a value length ($AL_j$) of the value ($V_j$) to an offset address content ($AV_j$), thereby obtaining encoded data offset ($CO_i$); and
combining, at the profile making entity, for each record ($R_i$), the encoded data record ($CR_i$) and the encoded data offset ($CO_i$) in an encoded personalization record ($UR_i$) as an output file,
wherein the offset table indicates, for each personalization field ($F_k$), an offset address (AV) of the master profile at which the value ($V_j$) of the personalization values ($V_1 \ldots V_m$) is to be inserted.

10. The method according to claim 9, wherein coding the one or more data records comprises coding with a type length value coding.

11. The method of claim 9, wherein providing the master profile comprises providing the master profile in a type length value encoded format by:
parsing the master profile to identify profile elements ($PE_r$) in the master profile and identifying their respective start positions ($S_r$) and end positions ($E_r$) in the master profile;
generating a range table (RT) comprising a record for each profile element ($PE_r$), including fields corresponding to the start position, the end position and a profile element offset ($\Delta$); and
determining a shift of a given value (x) when data are inserted in the master profile in a given profile element ($PE_r$), updating the start position, the end position and the profile element offset ($\Delta$) in the range table (RT) as a function of the shift given value (x).

12. The method of claim 11, wherein determining the shift comprises summing the shift given value (x) to each start position ($S_r$), end position ($E_r$) and profile element offset ($\Delta$) subsequent to the insert position of the data.

13. The method of claim 11, further comprising performing modifications to a derived master profile by:
evaluating whether the offset table includes addresses (AV) which are greater than the address of the start position ($S_{r+1}$) of the profile element ($PE_{r+1}$) following a given profile element $PE_r$ previously modified;
when negative, reusing the personalization data ($R_i$) and the corresponding offset table to obtain a personalization profile; and
when positive, for each personalization field ($T_j$) to which an associated address value ($AV_j$) of the offset table is higher than the start position ($S_{r+1}$), adding a given shift (x) to the address value (AV) to combine the personalization data in the derived master profile to obtain the personalization profile.

14. The method of claim 11, wherein parsing comprises performing parsing for segmentation and range table calculation once a range table is stored, or at runtime when requested.

15. A computer-program product comprising a non-transitory computer readable storage medium storing instructions that, when executed by a processor, perform the steps of:
providing, at a profile making entity, a table comprising a plurality of data records ($R_1 \ldots R_n$) corresponding to a plurality of profile data, wherein each data record of the plurality of data records ($R_1 \ldots R_n$) comprises a plurality of personalization fields ($T_1 \ldots T_m$) to store different types of personalization values ($V_1 \ldots V_m$), and wherein two different data records of the plurality of data records ($R_1 \ldots R_n$) correspond to two different profile packages;
providing, at the profile making entity, a master profile comprising fields to be personalized ($F_1 \ldots F_k \ldots F_p$) corresponding to one or more of the data records ($R_1 \ldots R_n$) to store the different types of personalization values ($V_1 \ldots V_m$);
coding, at the profile making entity, the one or more of the data records ($R_1 \ldots R_n$) to be combined with the master profile, wherein coding comprises associating a tag ($G_j$) to a personalization field ($T_j$), a length ($L_j$) of a value ($V_j$) inside the personalization field ($T_j$), and the value ($V_j$) itself, thereby obtaining encoded data records ($CR_i$);
applying, at the profile making entity, a coding to an offset table, wherein applying the coding comprises associating a tag (AG) to the personalization field ($T_j$), a value length ($AL_j$) of the value ($V_j$) to an offset address content ($AV_j$), thereby obtaining encoded data offset ($CO_i$); and
combining, at the profile making entity, for each record ($R_i$), the encoded data record ($CR_i$) and the encoded data offset ($CO_i$) in an encoded personalization record ($UR_i$) as an output file,
wherein the offset table indicates, for each personalization field ($F_k$), an offset address (AV) of the master profile at which the value ($V_j$) of the personalization values ($V_1 \ldots V_m$) is to be inserted.

16. The computer-program product of claim 15, wherein the instructions for coding the one or more data records comprises instructions for coding with a type length value coding.

17. The computer-program product of claim 15, wherein instruction for providing the master profile comprises instructions for providing the master profile in a type length value encoded format by:
- parsing the master profile to identify profile elements ($PE_r$) in the master profile and identifying their respective start positions ($S_r$) and end positions ($E_r$) in the master profile;
- generating a range table (RT) comprising a record for each profile element ($PE_r$), including fields corresponding to the start position, the end position and a profile element offset ($\Delta$); and
- determining a shift of a given value (x) when data are inserted in the master profile in a given profile element ($PE_r$), updating the start position, the end position and the profile element offset ($\Delta$) in the range table (RT) as a function of the shift given value (x).

* * * * *